United States Patent Office 3,425,968
Patented Feb. 4, 1969

3,425,968
NON-CURLING GUMMED COATED PAPER, METHOD AND COMPOSITION FOR MAKING THE SAME
Thomas L. Reiling, 200 Walnut St., Dedham, Mass. 02026
No Drawing. Continuation-in-part of applications Ser. No. 176,502, Mar. 7, 1962, and Ser. No. 355,914, Mar. 30, 1964. This application Sept. 17, 1965, Ser. No. 488,231
U.S. Cl. 260—8          35 Claims
Int. Cl. C09j 3/14, 7/04

ABSTRACT OF THE DISCLOSURE

Non-curling gummed products include a layer of water remoistenable gum globules adhered to each other and to a base in a discontinuous phase. A water insoluble resin is also present as a discontinuous phase and forms a non-porous film, with the gum globules which make up at least 85% by weight of the layer. For release type coatings, the gum is insolubilized by use of formaldehyde, and the like; or a thermoplastic resin may be added to provide a layer having heat seal properties. A coating material is also described which includes 100 parts gum, 10–50 parts of water, 2–16 parts of a water insoluble polymer which acts as a protective colloid, and a solvent for dissolving the polymer; the gum being present as dispersed finely divided gum globules of very small size. Specific materials and methods of preparing coating compositions and coated products are also described.

---

This invention relates generally to gelatin or gum coatings and the process for the preparation of such coatings and associated compositions. This application is a continuation-in-part of my application Ser. No. 176,502 filed Mar. 7, 1962 and now abandoned, and my application Ser. No. 355,914 filed Mar. 30, 1964, now abandoned.

Gum coatings are necessary and desirable for a great number of applications upon various forms of webbing such as paper, cardboard, fabric and other sheet materials, to produce such products as moistenable labels, stamps and the like.

A major problem which has been encountered in the coating of sheet and webbing surfaces with a remoistenable adhesive, hereinafter referred to as "gum" or "glue," is that a tendency to curl has been caused by the differential moisture absorbing properties of the paper and webbing and of the gum coating (the gum and the web sheeting material being of differing hygroscopicities). As the gum coating generally takes on more moisture from high humidity ambient air than does the paper or other sheet to which it is bonded, the gum surface expands more than the sheet which thus causes curling of the sheet material away from the gum side of the sheet. On the other hand, if the coated sheet is subjected to an atmosphere of low moisture content, the gum layer will lose more moisture and will contract more than the sheet, causing the sheet to curl toward its gummed side.

Several approaches have been employed in attempting to prevent such curling. One of these approaches has been to pass the coated sheet over a series of breaker bars which are set at particular angles so as to cause the gum layer to be broken into small sections. In this way each of the small sections is allowed to contract and expand individually and thereby minimize lateral forces across the surface of the gum layer. This approach for preventing curl, however, has not been entirely satisfactory and may be a disadvantage since breaking may adversely affect the printing surface of the gummed sheet.

Another approach to preventing curl in such gum coated paper products has been to utilize a polymer or resin binder which holds the gum particles to the paper base and to each other. Such binding resin has been both water soluble and water insoluble in nature and form. The particles so bound in the matrix to the backing material have been in the past, individual ground gum particles as shown in the United States patent to Davis 2,793,966, for example.

There are several disadvantages to the above approaches to preventing curl. The first of the objections is that most of the prior art requires the gum particles to be ground when added to the liquid phase of the coating mixture. Such grinding entails high cost and is objectionable for that reason. A second objection is the relatively high cost of resin relative to the gum, the resin binder being an essential element of the coating and being present in an amount sufficient to act as a binder for the gum. In the use of a resin binder deposited from a solution of organic solvent, some of the dissolved binder tends to filter through the gum particles and to be absorbed into the web where it is lost as a binder. In contrast, in the practice of the present invention, the gum acts as its own binder, and at the same time, provides a large surface area of exposed gum particles which enhances rapid activation of the coating upon wetting, or increases the release area of the coating in the case of pressure sensitive release coatings. The large exposed gum surface area allows a reduction of as much as fifty percent in the coating weight of gum for an equal wet tack level as compared to the product described in the said Davis patent.

Another difficulty which arises in the use of such gum and the necessary resin binding matrix coatings, is that the resin binder actually covers a portion of the water moistenable gum. Such a covering effect must be taken into account when proportioning the gum adhesive with respect to the resin binder used. Binders are themselves of little value as water soluble adhesives and tend to be detrimental to the initial wet tack adhesive properties of the coating. A larger amount of water moistenable adhesive must be used due to such a covering effect. Where no binding matrix is employed, this amount may be materially reduced.

The optimum condition for a non-curling remoistenable gummed paper would be that of discrete relatively small gum particles adhered to the backing material without any exterior binder phase. In addition, the cost of grinding the gum into powdered form should be, if possible, eliminated. In accordance with the present invention, both of these objects are successfully achieved, and a discontinuous and, therefore, non-curling gum coating is provided on a base sheet by depositing individual particles of an aqueous gum solution upon the base sheet in such a manner that the gum particles adhere to the sheet by reason of the natural adhesive property of the gum and yet are not so diluted with water that they lose their finely divided form.

The major object of the present invention is the utilization of the physical-chemical properties of a relatively high molecular weight water insoluble resin or polymer to form a stable dispersion of liquid water soluble gum in an organic liquid. While the action of the polymer in this system is not completely understood, it is believed to function as a stabilizer to maintain the discrete gum globules dispersed by an action similar to that of a protective colloid.

Such globules of liquid gum, preferably microscopic in size, are caused to form a suspension, a portion of which may be as small as colloidal in dimension. The water insoluble resin or polymer is used in relatively low percentages when compared with the amount of water soluble gum in the mixture. Proper proportions of glue in the organic solvent and water mixture should be observed in order to obtain the final suspension wherein the glue is in the form of fine particles or droplets of wetted glue.

The suspension produced is a dispersion of preferably microscopically sized globules of liquid gum in a water in oil suspension wherein the continuous phase is a water insoluble resin or polymer dissolved in a solvent. The resulting dispersion may be sprayed, wiped, dipped, or otherwise conventionally coated upon backing sheets of various materials and the water and the organic solvent then driven off. The product formed includes a relatively oil impermeable layer of discrete and individual gum particles which have attached themselves to the backing material and to each other at points of contact by reason of their own adhesive properties. The resin and glue form two separate phases which together cooperate to form a relatively non-porous layer. Due to the relatively low concentration of resin in the solvent, it is believed that a substantial portion of the resin is absorbed into the cellulosic backing member so that the glue particles in the layer appear as discrete solid particles touching each other tangentially, and the layer is free of substantial amounts of resin. This provides a large exposed gum surface area for quick activation.

The product thus formed is superior to other adhesive coatings in that it effectively eliminates curl while presenting a more economically feasible coating than many of the known gum coating compositions.

Another advantage of the present invention is that the coating of the gum may be carried out without the use of explosive and inflammable solvents. In order to effect such an advantage, in the case where water miscible organic solvents are used, the solvent is selected from the family of glycols. Such compounds as hexylene glycol can be used without special precautions. This advantage permits the utilization of standard coating equipment for the production of a flat gummed sheet. This also eliminates the costly special equipment for mixing, handling and coating with inflammable solvents.

One of the problems which may be involved in mixing the glues and gums with resins is that a large amount of organic solvent may be required in order to obtain the desired low viscosity of the mixture. At higher solids content and especially with non-polar solvents, a firm gel may be formed with certain resins which requires extreme dilution to provide a composition of coatable consistency. The physical nature of the gel is not known, but the high viscosity is believed due to the isoelectric point of the gum, that is, the pH at which the gum exhibits lowest solubility.

One of the objects of this invention is to provide a chemical means for breaking up the gel and therefore avoiding the necessity of using large amounts of organic solvents to arrive at a composition of coatable consistency. It was determined that the addition of an electrolyte has the effect of lowering the viscosity of the mixture of gum, resin, solvent and water, and also improves the adhesion of the gum particles to each other and to the base sheet.

In some cases, the same effect may be produced by heating the adhesive component to break up the gel particularly if the temperature is raised close to the vaporization point of the organic liquid or close to the decomposition temperature of the gum.

It is an object of this invention to provide an improved gum layer suitable for adhesive purposes such as stamps, labels, envelopes, tapes, etc.

Another object of this invention is to provide an improved gum layer which can be used as a pressure sensitive release coating.

Still a further object of this invention is to provide an improved gum layer which can be used as a grease proof coating.

Yet another object of this invention is to provide a gum layer which can be used as a binder for fibers in nonwoven fabrics.

A further object of the present invention is the provision of a non-adhesive coating for publication grade printing papers.

A further object of the present invention is the provision of a coating having direct heat sealing properties and delayed action heat sealing properties.

A further object of this invention is to provide a gum layer of discrete individual gum particles in which the layer comprises 85% or more by weight of gum so as to provide the maximum specific surface of gum available for adhesion or coating purposes. The resin may be removed by a solvent, but insignificant amounts of gum are lost due to the fact that the gum is acting as its own binder. It will be obvious therefore, that in cases where the resin is removed by solvent, the qualities of the gum coating per se will not be altered substantially, nor is the bond between gum particles or between the gum particles and the base substantially reduced.

DETAILED DESCRIPTION OF THE PROCESS

The process of obtaining a dispersion of finely divided water soluble gum particles in a water-solvent mixture by the use of a water insoluble resin is as follows:

(1) The water soluble adhesive component is added to the water miscible and/or immiscible organic solvent and heated to not less than approximately 100° F. and preferably up to slightly less than the vaporization temperature of the organic liquid used, or slightly less than the decomposition temperature of the gum. The mixture is then agitated briskly. The mixing and heating may be carried out in an open top steam kettle.

(2) Water is added while heating and agitation is continued.

(3) A quantity of water insoluble organic resin is added to the solution of gum, and continuous agitation as well as continued heating is carried out until a temperature is reached which is slightly below the decomposition temperature of the gum or the resin whichever is lower, or below the vaporization temperature of the organic liquid whichever is lower. It is maintained at this temperature for approximately between 20 and 60 minutes. The consistency and appearance of the dispersion at this point is that of a creamy or milky liquid depending upon the additives in the gum and upon its pigmentation.

(4) A quantity of organic solvent at room temperature is added to dilute the heated mixture produced by steps 1 through 3. Such solvent may be the same solvent as that added in step No. 1 or may be another organic solvent, such as hereinafter described. The appearance and consistency of the mixture at this point resembles a colloidal suspension or a finely divided dispersion of gum particles in the liquid medium.

(5) The product composition is now coated on paper or other base, and the coated sheet is heated in order to remove the water and solvents from the gum layer and the coated base.

FIRST ALTERNATIVE DESCRIPTION OF THE PROCESS

Though the above procedure is applicable to certain compositions, it has been found that the following procedure is preferential from the standpoint of large batch industrial applications:

(1) The water soluble adhesive component, the water insoluble organic resin, the water miscible and/or immiscible organic solvent and water, if necessary, are brought together and the mixture is heated to not less than 100° F. and preferably to slightly less than the vaporization temperature of the organic liquid used or slightly less than the decomposition temperature of the gum or of the resin and to whichever of these temperatures is the lowest. The mixture is agitated brisky, but not sufficiently to entrail air in the liquid mixture. The mixing and heating may be carried out in a steam kettle.

(2) Water may, if necessary, be added while heating and agitation is continued.

(3) The mixture is then heated and continuously agitated at the temperature described in step 1, for approximately from 20 to 60 minutes. It will be obvious that additional water, solvent, insoluble organic resin, and gum may be added in order to alter the consistency of the mixture during the period that the mixture is heated and agitated. During the period of heating and agitation, and preferably at the beginning of the heating and agitation, a quantity of an electrolyte is added to the heated gum water and resin composition. The amount of electrolyte used is dependent upon the type of gum, the properties of the finished product, and the like. In flat gum paper formulations where the gum is to be activated by licking with the tongue, an odorless material which may be used for gum of the extracted bone glue type is citric, salicylic, or tartaric acid. The consistency and appearance of the dispersion at this point is that of a creamy or milky liquid, depending upon the additives in the gum and upon its pigmentation.

(4) A quantity of organic solvent at room temperature is added to dilute the heated mixture produced by steps 1 through 3. Such solvent may be the same solvent as that added in step 1 or may be another organic solvent. The appearance and consistency of the mixture at this point appears to be a colloidal suspension or a finely divided dispersion of gum particles in the liquid medium.

(5) The product composition is then coated on paper or other base sheet, and the coated sheet is heated in order to remove the water and solvents from the gum layer.

SECOND ALTERNATIVE PROCESS FOR IMPROVED RELEASE PROPERTIES

Although the process described heretofore result in adhesive gums which have also release coating and grease proof coating characteristics, the following process may be used to develop a coating primarily employed for release and grease proof purposes.

Steps 1 through 4 in the process or first alternative process referred to above are initially carried out.

(5) Cool this mixture to room temperature and add a release type silicone resin such as Dow Corning 23 and an appropriate silicone release catalyst such as Dow Corning 23 catalyst.

(6) The composition is now mixed thoroughly, and formaldehyde and toluene added with mixing. The formaldehyde or toluene and/or both may be mixed directly with the silicone resin and catalyst simultaneously in step 5, if desired.

For other types of release paper, the silicone, formaldehyde and toluene may be used individually and exclusively or in mixtures as desired.

Release paper may be described as an easily removed cover sheet for a sheet or web coated with a pressure sensitive adhesive. The purpose of the release paper is to allow the pressure sensitive coated web to be removed by simple peeling action yielding an article which has strong adhesive properties to other substances when applied with moderate pressure.

The adhesive on the pressure sensitive coated side of the web is a rubber or latex-like substance usually made up of a mixture of polymers, plasticizers and tackifiers. It is generally a balance of various ingredients to give the desired adhesive and tack properties. It is therefore important that the release paper coating be free from any materials which adversely affect this balance and spoil the adhesive properties of the pressure sensitive coating during storage or under varying temperatures.

It is important also that the release paper is of such a nature to hold the coated pressure sensitive adhesive until it is removed by a peeling action, and to allow the desired coated web to be removed with a normal amount of force.

In the past years there has been considerable amount of work done in this field. The tendency of the release coating and the pressure sensitive coating to react has caused considerable trouble particularly after long storage at low temperatures or above normal temperatures. It has been demonstrated that the inter-reaction will cause the paper to be too easily removed, or not able to be removed at all, or poor adhesion of the coated web results.

The ideal release paper is on having a coating to which a pressure sensitive adhesive will adhere uniformly but from which it can be easily and cleanly removed by slight effort. To accomplish this, most release paper is made from a glassine sheet which has been coated with a silicone resin. The glassine is a non-porous sheet which will hold the coating on the surface. The silicon is an inert material to which the pressure sensitive coating will adhere smoothly but from which it can be parted without too much effort leaving maximum adhesive strength in the separated pressure sensitive adhesive.

It is one purpose of this invention to produce a release paper similar to glassine release paper but at a considerable saving. As heretofore set out, a mixture of a water soluble gum of minute particle size, a resin or polymer and formaldehyde, is deposited on a web from a mixture of water and organic liquid. This yields a discontinuous film on the surface of the web when the liquids are removed by heat. Most pressure sensitive adhesive formulations are unaffected by water soluble gums. However, added protection is obtained by insolubilizing the gum with a material such as formaldehyde. Such a treatment results in a sheet which does not react with most pressure sensitive adhesives. In some cases this treatment alone will be sufficient to perform the desired function, but to assure the widest range of protection of the coating from the adhesive, it is preferable to add a silicone with the catalyst to provide a sheet similar in properties to those currently used but at a substantially lower cost.

The coating of the invention for providing such a release paper is prepared by adding formaldehyde, paraldehyde or other insolubilizing agent along with the silicone and required catalysts to the mixture of glue, resin, water and organic solvent in the processes described above.

A sheet such as unbleached kraft is coated with the release coating composition of the present invention, dried, and laminated to a pressure sensitive coated web. Such a composition gives the same excellent release properties as glassine paper coated with silicone, and much lower cost base stock can be used as compared to the many times more expensive glassine sheet.

It is believed that the greatest reproducibility has been found when the steps are carried in the order set forth and described. In addition to the steps set out, filler and glue additives may be added preferably during the final heating and mixing step in order to vary the adherence proportion and preservation properties of the adhesive layer.

COMPONENTS

Adhesive components

The major adhesive component in the coating mixture and coated product is a water soluble gum of the following types: natural gum resins, gum tragacanth, gum arabic, glues such as animal bone glue, hide glue, vegetable glue, and fish glue, agar-agar, methyl and ethyl cellulose, and such synthetic resins as: carboxyl methyl cellulose, polyvinyl alcohol, starches and dextrine, and starch products such as British gum and dextrine.

Resin polymer

The resin used is preferably a polymer having a high molecular weight as compared with the low molecular weight polymers of the same class. It may be in either latex or solid form.

Resinous materials which may be employed for example are: Methyl acrylate resins, ethyl acrylate resins, butyl acrylate resins, polybasic acid polyhydric alcohols resins (Glyptals), polyvinyl acetates and polyvinyl acetate copolymers, and rubber polymers both natural and synthetic.

The water insoluble resin component may also include a small percentage of plasticizer if it is compatible with respect to the resin employed.

A commercial copolymer of ethyl acrylate and methyl methacrylate which has been found satisfactory for producing the gum sheet product in accordance with this invention is RHoplex B-15. Other RHoplex resins which have been used include 25% methacrylate polymer dispersion in water (B-19), and 40% dispersion of methacrylate-vinyl acetate copolymer in water (WG-6), and B-10 which is believed to be a carboxylated ethyl acrylate copolymer and of lower molecular weight than the B-15.

A commercial copolymer of butadiene and styrene which has been found to be satisfactory is that marketed under the trade name Darex 6600, and another suitable material is the commercial homopolymer of polyvinyl acetate emulsion marketed as Polyco 577G.

Organic solvents

The solvents used, as listed below, may be used alone or in combination: alcohols such as methyl alcohol, ethyl alcohol, isopropyl alcohol, ketones such as acetone, methyl ethyl ketone, glycols such as hexylene glycol; benzene, xylene, toluene, naptha, di-acetone, and the chlorinated hydrocarbons such as methylene chloride, trichloroethylene and perchloroethylene.

Any of the above solvents alone or in combination may be utilized for the diluting step referred to above.

Electrolytes

A number of electrolytes may be used as follows: sulfuric, acetic, citric and tartaric acids; salts such as ammonium thiocyanate, urea, sodium bisulfite, sodium chloride and sodium nitrate. Any of these may be used to increase the adhesion of the gum towards the base member and/or to reduce the viscosity of the coating mix.

Release compositions

Materials which act as release agents to increase the release characteristics of the coated sheet include silicones, formaldehyde, paraldehyde, and solvent soluble thermosetting resin such as phenolics, melamine and urea formaldehyde resins, and polytetrafluoroethylene (Teflon) or any other well known release composition. The percentages used may vary up to 65 parts as compared to the glue component.

Proportions of components

The preferred ranges of components based on 100 parts by weight of the water soluble adhesive component (gum) are the following: organic solvents 15 to 140 parts, water insoluble resin 2 to 6 parts (solids basis), water 10-50 parts, electrolyte 1 to 25 parts (1% to 15% of the total), and diluting solvent 40 to 200 parts.

The amount of water used in the coating mixture varies with the type gum used, and in each case should be kept below the amount which will produce a continuous gum phase. To this extent, the amount of water is critical.

It has been observed that if the water content is below a predetermined amount, which varies with the type gum, the wet gum particles will only partially dissolve and will not be sufficiently moist to adhere to the base sheet. For the majority of gum materials useable in accordance with the present invention, a minimum of 10 parts water per 100 parts of gum by weight should be employed. If too little water is used, the gum particles rather than adhering to the base will lie on the surface of the base sheet and tend to dust off.

In the event that too much water is used, e.g. more than 50 parts for each 100 parts of the majority of gums useable in accordance with the present invention, the ratios being by weight, the resulting coating will dry to a continuous glue film similar to that applied in a conventional manner from solution. Under such conditions where the initial ratio of water to glue is too high, if the amount of resin is increased sufficiently to produce a dispersion, the resulting coating will still approach a continuous film, and the water will unduly wet the sheet and cause contraction thereof during the subsequent drying.

This contraction and/or combination and near continuous film creates a stress or tension in the sheet which should be relieved by a breaking operation in order to produce a non-curling sheet. Even so, a sheet coated from such a mixture and broken still exhibits a noticeable tendency to curl at the high and low extremes of relative humidity, as opposed to the sheet of the present invention which remains flat at the same high and low extremes. Additionally, the use of increased amounts of resin operates to reduce the wet tack of the remoistened sheet. The object of this invention is to avoid the breaking operation and the increased amounts of resin needed to produce a stable dispersion due to the increased amount of water used.

Fillers

Various types of fillers may be added to the precipitated product so long as the percentage of solids to liquids is maintained within the specified range. Various fillers may be used in order to give specific advantages and properties to the final coated product and to effect economical savings in regard to the cost of the components employed in the various formulations. Fillers of finely divided water soluble gums such as dry pre-cooked dextrine particles (300 mesh or smaller) and finely divided synthetic gums such as water soluble cellulose esters and polyvinyl alcohols may both be used as such fillers and are held on the base by the gum globules.

An adhesive coating may be produced by utilizing the presently described invention together with a filler of a finely divided thermoplastic filler such as finely divided polystyrene in order to give the coating heat sealable properties. Such a coating may be made by adding a thermoplastic resin to the coating composition in an amount so that the solids added are from 10-75% of the total gum weight. For such coatings as are desired to have the property of inertness of the adhesive layer to organic solvents, fillers from the group of thermosetting resins may be used, such as finely divided phenolic resins, in an analogous method with the transition from "B" to "C" stage taking place on the dried sheet. For delayed action heat seal properties, a plasticizer is added to the heat seal mixture above described, for example, diphenyl phthalate and dicyclohexyl phthalate, and the like.

THIRD ALTERNATIVE METHOD

Though the methods above are the most economical from the standpoint of time and cost, the heating step may be avoided as follows:

(1) Mix glue and water together and allow to stand until glue and water form a solution.

(2) Mix resin and solvent together and allow to stand until resin and solvent form a solution.

(3) Take the two separate solutions of steps (1) and (2) and add together and agitate to form the gum suspension. The electrolyte and improved release materials, i.e., silicone, formaldehyde etc. and the diluting solvent as required, will be added into the mixture of solutes in step 3 to form the various coating compositions discussed herein.

Specific examples

Having described the invention in general terms and listed the components, specific examples of the gum composition formed by this method are the following:

Example 1.—Ten pounds of glue were added to four pounds of isopropyl alcohol (absolute), heated to 100° F. and agitated. One pound of water was added and the heat increased slightly while continuing agitation. One pound of RHoplex B-15 (which is 47% water emulsion of the water insoluble resin) was added and the heat increased to 140° F. while continuing agitation. The temperature then was raised to 170° F. and maintained for 30 minutes. The appearance of the product at this point was creamy or milky in color.

Next, six pounds of diluting isopropyl alcohol (absolute) were added at room temperature. A paper web coated with the resulting composition presented excellent wetting properties and showed no tendency to curl upon great variations in the atmospheric humidity to which it was exposed.

Example 2.—The glue of Example 1 was replaced with pre-cooked dextrine and the same process carried forth.

Example 3.—The process described in Example 1 was carried out by replacing the RHoplex B-15 with Darex 6600, a butadiene styrene polymer.

Example 4.—The diluting solvent used in Example 1 (isopropyl alcohol) was replaced with an equivalent quantity of acetone and substantially the same results were obtained.

Example 5.—The diluting solvent (isopropyl alcohol) of Example 1 was replaced with methyl ethyl ketone and again the same results were produced.

Example 6.—The glue utilized in Example 1 was replaced with high test (200 Bloom) gelatin and globules were formed which were coatable upon a base so as to produce much the same type surface as that by Example 1.

Example 7.—The resin material of Example 1, RHoplex B-15, was replaced with Polyco 577G, a homopolymer polyvinyl acetate emulsion. The glue globules resulting were of substantially the same size and shape and of the same general characteristics as those produced by Example 1.

Example 8.—Ten pounds of animal glue were added to 7.5 pounds of hexylene glycol, and the mixture heated to 140° F. and agitated. Two pounds of water were then added and the heat increased slightly while continuing agitation. One pound of 47% RHoplex B-15 emulsion (in water) was added and the heat increased to 180° F. while continuing the agitation. To this hot mixture an additional amount of 3 pounds of water was added and the entire mixture agitated and heated at the same temperature for approximately 30 minutes. The resulting composition was then applied to a paper web and dried by applying heat to the coated side of the webbing. The result was a coating of firmly attached finely divided particles of glue. This example shows that inflammable solvents are not necessary to carry out the coating method of the present invention. Due to the fact that the flash point (open cup) of hexylene glycol is 230° F., the danger of explosion and the consequent cost involved in handling such solvents as would be explosive is not encountered. Substantially the same coating apparatus as is presently used for straight water solutions of glue may be utilized for the application of the present gluing composition.

Example 9.—The RHoplex B-15 emulsion of Example 8 was replaced with a copolymer of ethyl acrylate and methyl methacrylate manufactured under the trade name Polyco 2715. The results were identical with Example 8.

Example 10.—The process of Example 8 was carried out exactly as described with the exception that during the 30 minute agitation period, 3 pounds of finely divided pre-cooked dextrine (300 mesh or smaller) and 3 additional pounds of water were added. A discontinuous coating of glue globules surrounded by an additional coating of dry dextrine resulted. This example shows that the filler added actually coats the outside of the gum particles.

Example 11.—100 parts of glue were added to 50 parts of methyl alcohol and 100 parts of toluene with the application of heat and agitated. 16 parts of water were added and the heat increased slightly with continued agitation. 6 parts of RHoplex B-15 (which is 47% water emulsion of the water insoluble resin) were added and the heat increased to between 120° and 160° and preferably to 140° while continuing agitation. At this point 6 parts of citric acid were added and the temperature raised gradually to slightly less than the temperature at which either the solvent vaporizes or the RHoplex or glue decomposes. The temperature was maintained for 30 minutes; alternatively, the citric acid may be added during this 30-minute stage. The product at this point had a creamy or milky consistency. Next, 130 parts of toluene at room temperature were added. The resulting product was coated upon the base and then dried.

Example 12.—This example is exactly identical with Example 8 except with the addition of tartaric acid during the 30-minute heating stage subsequent to the addition of the 3 pounds of water. About 6% of the total composition will be tartaric acid.

Example 13

| | Grams |
|---|---|
| Bone glue | 100 |
| Toluene | 100 |
| Methanol | 50 |
| Methyl ethyl methacrylate polymer | 4 |
| $H_2O$ | 10 |
| Glacial acetic acid | 5 |
| Silicone (Dow Corning 23) | 10 |
| Catalytic silicone (Dow Corning 23) | ¼ |
| Toluene | 25 |
| 37% formaldehyde | 25 |

Example 14.—The following materials were mixed as previously described and applied to a base stock to provide a coating for publication grade paper.

| | Grams |
|---|---|
| Pre-gelatinized starch | 100 |
| Water | 50 |
| Citric acid | 10 |
| RHoplex B-15 | 10 |
| Toluene | 200 |

Example 15.—The following formulation provides a delayed action heat seal coating:

| | Grams |
|---|---|
| Pre-gelatinized starch | 100 |
| Water | 50 |
| RHoplex B-15 | 50 |
| N-cyclohexyl para-toluene-sulfonamide plasticizer (Sanitizer 14) | 20 |
| Toluene | 200 |

In this formulation, a portion of the RHoplex was added during the formation of the coating mixture to stabilize the dispersion of gum globules, the remainder having been added later to provide heat seal qualities in the finished product.

The present invention offers several advantages over the procedures, compositions and products of the prior art. It makes it unnecessary to grind the gum, since the added water, which is preferably mixed through the action of hydraulic shear, provides relatively small gum globules substantially uniformly dispersed in a carrier liquid which includes a relatively small amount, based on the weight of the gum, of a polymeric material capable of functioning essentially as a protective colloid. The same result may be accomplished by mild mixing while the mixture is heated. The gum acts as its own binder when deposited on a base member, and therefore it is not necessary to use a polymeric material as a binder component. In fact, the polymeric material used in accordance with the present invention may be rinsed off the finished product by an organic solvent leaving on the base a coating which includes a multiplicity of solidified gum globules joined to each other tangentially and to the base.

By the present invention, it is not necessary to break the coated sheet as is necessary with some of the products of the prior art since the gum phase is essentially discontinuous in the final product. Additionally, the amount of water used in the coating formulation is relatively low and does not saturate or wet the base member sufficiently to cause contraction thereof on drying thus resulting in development of tension in the backing member which must be relieved in order to provide a flat gummed member.

The gummed product in accordance with the present invention also exhibits good solvent holdout or ink holdout properties, a definite advantage in the manufacture of release papers or decalcomania. The coated surface is hydrophilic in nature and can be printed by any of the conventional printing techniques. Because the sheet is flat and the backing member is essentially free of internal tensions, the sheets remain flat over a wide range of relative humidity, and the coated product of the present invention is easily handled by conventional sheet fed printing press equipment.

While the invention has been described, it will be understood that it is capable of further modifications, and this application is intended to cover any variations, uses or adaptions of the invention following in general the principles of the invention and including such departures from the present disclosure as come within known or customary practice in the art to which the invention pertains.

What is claimed is:

1. A coated member comprising sheet material, a layer on said sheet material, said layer including a multiplicity of water remoistenable gum particles adhered to each other and to said sheet material by the natural adhesive properties of the gum particles, said gum particles being present in said layer as a discontinuous phase, a water insoluble organic polymer present as a second discontinuous phase and preventing contact between at least some of said gum particles, said discontinuous gum phase cooperating with said discontinuous polymer phase to form an essentially non-porous film, said polymer being present in an amount by weight of between 2 and 16 parts per 100 parts of gum, and said layer including an electrolyte present in an amount by weight of between 1 and 25 parts per 100 parts of gum.

2. A non-curling adhesive gum coated member comprising cellulosic sheet material, a layer on said sheet material, said layer including a multiplicity of water-activatable gum particles adhered to each other and to said sheet material by the natural adhesive properties of the gum particles, said gum particles being present in said layer as a discontinuous phase, a water insoluble organic polymer present as a second discontinuous phase and preventing contact between at least some of said gum particles, said discontinuous gum phase cooperating with said discontinuous polymer phase to form an essentially non-porous film, and said gum particles constituting at least 85% by weight of the total weight of said layer.

3. A coated member comprising sheet material, a layer on said sheet material, said layer including a multiplicity of solidified essentially individual gum globules, said globules being adhered to each other and to said sheet material by the natural adhesive properties of the gum globules, said gum globules being present in said layer as a discontinuous phase and contacting the adjacent gum globules tangentially, a water insoluble organic polymer present as a discontinuous phase and preventing contact between at least a portion of said gum globules, said gum phase cooperating with said said polymer phase to form an essentially non-porous film, and said gum globules constituting at least 85% of the total weight of said layer.

4. A coated member as set forth in claim 3 wherein said layer includes an insolubilized gum globule.

5. A coated member as set forth in claim 3 wherein said layer includes a release agent.

6. A coated member as set forth in claim 3 wherein said gum globules in said layer are water activatable to an adhesive condition.

7. A coated member as set forth in claim 3 wherein said layer includes a finely divided filler thermoplastic material in addition to said polymer and said gum globules.

8. A coated member as set forth in claim 7 wherein said layer includes a plasticizer.

9. A coated member as set forth in claim 7 wherein said thermoplastic material is present in an amount between 10% and 75% by weight of the weight of said gum globules.

10. A coated member as set forth in claim 3 wherein said layer includes filler material.

11. A coated member as set forth in claim 2 wherein said layer includes an electrolyte and between 2 and 16 parts by weight of said polymer.

12. A coated member as set forth in claim 11 wherein said electrolyte is present in an amount by weight of between 1 and 25 parts per 100 parts of gum.

13. A coated member comprising sheet material, a layer on said sheet material, said layer including a multiplicity of solidified water activatable essentially individual gum globules adhered to each other and to said sheet material by the natural adhesive properties of the gum globules, said gum globules being present in said layer as a discontinuous phase, a water insoluble organic polymer present as a discontinuous phase and preventing contact between at least some of the said gum globules, said discontinuous gum phase cooperating with said polymer phase to form an essentially nonporous film, and said polymer being present in an amount between 2 and 16 parts by weight per hundred parts of gum globules.

14. A coated member as set forth in claim 13 wherein said sheet material is a cellulosic sheet member, and wherein said gum globules are water activatable.

15. A coated member as set forth in claim 14 wherein said gum globules are insoluble to prevent water activation thereof.

16. A coated member as set forth in claim 13 wherein said layer includes an electrolyte for increasing the adhesion of said gum globules to said sheet material, and said electrolyte being present in an amount between 1 and 25 parts by weight per hundred parts of gum.

17. A coated member as set forth in claim 13 wherein said layer includes a filler thermoplastic polymer in addition to said polymer and said gum globules and present in an amount of from 10% to 75% by weight based on the weight of said gum.

18. A coated member as set forth in claim 13 wherein said layer includes a filler release agent present in addition to said polymer and said gum globules and in an amount by weight of up to 65% based on the weight of said gum.

19. A coated member as set forth in claim 18 wherein said layer includes a plasticizer.

20. A coating material for application to sheet material comprising 100 parts by weight of a water soluble gum, 10 to 50 parts by weight of water, 2 to 16 parts by weight of a water insoluble polymer, and an organic solvent for dissolving said polymer, said solvent being present in an amount sufficient to provide a mixture of coatable consistency.

21. A coating material as set forth in claim 20 including between 1 to 25 parts by weight of an electrolyte.

22. A coating material as set forth in claim 20 wherein said solvent is miscible with water.

23. A coating material as set forth in claim 20 including a material for insolublizing said gum.

24. A coating material as set forth in claim 21 including between 10% and 75% by weight based on the weight of said gum of a finely divided filler thermoplastic resin in addition to said polymer and said gum globules and softenable by heat to a tacky condition.

25. A coating material as set forth in claim 24 including a plasticizer for said thermoplastic resin.

26. A coating material as set forth in claim 20 including a filler release agent present therein in addition to said polymer and said gum globules and in an amount of up to 65% based on the weight of said gum.

27. A coating material as set forth in claim 20 wherein said gum is remoistenable after drying to a tacky condition.

28. A coating material as set forth in claim 20 wherein said gum is present in said mixture in the form of individual relatively small gum globules dispersed in said solvent, and wherein said polymer operates as a protective colloid to maintain said gum globules dispersed in said solvent.

29. The process of preparing a gum containing coating material for application to sheet material comprising the steps of mixing an organic solvent and a water soluble gum to form a dispersion of gum in said solvent, adding water to said dispersion to dissolve said gum and to form gum globules of relatively small size, and adding to said mixture an organic polymer soluble in said solvent for forming a protective colloid which helps to stabilize said dispersed gum globules, said water being present in an amount less than 50% by weight based on the weight of said gum.

30. The process as set forth in claim 29 wherein the water soluble gum is dissolved in water and the polymer is dissolved in said solvent, and wherein the solvent and water mixtures are thereafter intermixed to form a two-phase mixture of relatively small gum globules at least partly dissolved in water and dispersed in a solution of solvent and polymer.

31. The process set forth in claim 29 wherein water is present in an amount of between 10 and 50 parts by weight per 100 parts of gum, and said polymer is present between 2 and 16 parts by weight per 100 parts of gum.

32. The process of manufacturing a non-curling gum suspension comprising the steps of mixing 100 parts of a water soluble adhesive, an organic resin solvent having the ability to dissolve at least a limited quantity of said adhesive; water sufficient to dissolve said adhesive, and between 2 and 16 parts of organic resin per 100 parts of adhesive, heating the mixture to a temperature up to slightly below the vaporization temperature of said solvent or the decomposition temperature of said adhesive, or the decomposition temperature of said resin whichever is least, maintaining said temperature for about 20 to 60 minutes, adding an electrolyte to reduce the gel formed and diluting said heated mixture with additional organic solvent to thus form said suspension.

33. The process of manufacturing as set forth in claim 32, and wherein said adhesive equals 100 parts, said first mentioned solvent equals about 15 to 140 parts by weight based on said adhesive, said water equals about 10 to 50 parts by weight based on said adhesive, said organic resin equals about 2 to 16 parts by weight based on said adhesive, said electrolyte equals about 1 to 25 parts by weight based on said adhesive, and said diluting solvent equals about 40 to 200 parts by weight based on said adhesive.

34. An adhesive suspension for applying to a sheet and the like comprising, 100 parts by weight of a water soluble adhesive, 15 to 140 parts by weight based on said adhesive of an organic resin solvent having the ability of dissolving at least a small quantity of said adhesive, 10 to 50 parts by weight of water based on said adhesive, 2 to 16 parts by weight of an organic resin emulsion based on said adhesive, 1 to 25 parts of an electrolyte based on said adhesive, and 40 to 200 parts by weight of a diluting solvent based on said adhesive.

35. The process of manufacturing an adhesive gum suspension solution comprising the steps of mixing based on 100 parts by weight of a water soluble adhesive substance with from about 15 to 140 parts by weight based on said adhesive of an organic resin solvent, having the ability to dissolve at least a limited quantity of said adhesive substance, heating the resulting mixture and agitating briskly, adding about 10 to 50 parts by weight based on said adhesive of water to completely dissolve the water soluble adhesive while continuing heating and agitation, adding from about 2.0 to 16 parts by weight based on said adhesive of an organic resin emulsion while raising the temperature of the solution, and diluting the resulting mixture with from about 40 to 200 parts by weight based on said adhesive of additional organic resin solvent having the ability to dissolve at least a limited quantity of said adhesive.

References Cited
UNITED STATES PATENTS

| | | | |
|---|---|---|---|
| 3,285,764 | 11/1966 | Nelson et al. | 117—122 |
| 3,365,320 | 1/1968 | Minelli | 260—8 |
| 3,212,924 | 10/1965 | Asnes | 260—8 |

FOREIGN PATENTS 1,061,938  7/1959  Germany.

WILLIAM H. SHORT, *Primary Examiner.*

E. M. WOODBERRY, *Assistant Examiner.*

U.S. Cl. X.R.

260—17, 7.5, 17.4, 29.6, 29.7, 740, 742; 117—122